(12) United States Patent
Crivello et al.

(10) Patent No.: US 6,555,595 B1
(45) Date of Patent: Apr. 29, 2003

(54) PHOTOPOLYMERIZABLE COMPOSITIONS

(75) Inventors: James Vincent Crivello, Clifton Park, NY (US); Marco Sangermano, Turin (IT); Stephen Neal Falling, Kingsport, TN (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 09/974,010

(22) Filed: Oct. 10, 2001

(51) Int. Cl.$^7$ ................. C08F 2/46; C08F 2/50
(52) U.S. Cl. ............ 522/100; 522/101; 522/41; 522/42; 522/43; 522/46; 522/113; 522/114; 522/119; 522/120; 522/121; 522/122; 522/170; 522/181; 522/182; 428/413; 428/500
(58) Field of Search .................. 522/100, 170, 522/181, 40, 41, 42, 43, 46, 101, 113, 114, 119, 120, 121, 122, 182; 428/413, 500

(56) References Cited

U.S. PATENT DOCUMENTS

| | | | |
|---|---|---|---|
| 3,552,973 A | | 1/1971 | Fishman |
| 4,904,738 A | * | 2/1990 | Hardiman et al. .......... 525/306 |
| 5,071,930 A | * | 12/1991 | Blevins et al. ............ 526/271 |
| 5,227,533 A | * | 7/1993 | Plotkin et al. ............. 568/637 |
| 5,302,680 A | * | 4/1994 | Blevins et al. ............ 526/262 |
| 5,328,971 A | * | 7/1994 | Blevins et al. ............ 526/209 |
| 5,393,867 A | * | 2/1995 | Matayabas et al. ........ 528/412 |
| 5,434,314 A | * | 7/1995 | Matayabas et al. ........ 568/616 |
| 5,502,137 A | * | 3/1996 | Matayabas et al. ........ 528/393 |
| 5,536,809 A | * | 7/1996 | Matayabas et al. ........ 528/393 |
| 5,536,882 A | | 7/1996 | Matayabas, Jr. et al. |
| 5,559,192 A | * | 9/1996 | Bors et al. ............... 525/300 |
| 5,608,034 A | * | 3/1997 | Falling et al. ............ 528/409 |
| 5,652,328 A | * | 7/1997 | Falling et al. ............ 528/409 |

OTHER PUBLICATIONS

S. P. Pappas, Radiation Curing Science and Technology, Plenum Press, New York, 1992, pp. 1–20.

* cited by examiner

Primary Examiner—James J. Seidleck
Assistant Examiner—Sanza L. McClendon

(57) ABSTRACT

Disclosed are radiation-curable or photopolymerizable compositions, processes for applying and curing the compositions and articles bearing a cured coating of the compositions utilizing radiation-curable compositions which contain, in addition to the typical components of radiation-curable compositions, a polymer derived from 3,4-epoxy-1-butene.

11 Claims, No Drawings

PHOTOPOLYMERIZABLE COMPOSITIONS

FIELD OF THE INVENTION

This invention pertains to novel radiation-curable or photopolymerizable compositions, processes for applying and curing the compositions and articles bearing a cured coating of the compositions. More specifically, this invention pertains to radiation-curable compositions which contain, in addition to the typical components of radiation-curable compositions, a polymer derived from 3,4-epoxy-1-butene.

BACKGROUND OF THE INVENTION

Radiation curing or photopolymerization (photo-induced free radical polymerization) has become an important and useful technique for applying and curing coatings, inks and adhesives. Radiation-curable compositions typically comprise as essential components one or more radiation-curable monomers and a photoinitiator. The compositions are applied as a coating to various articles and surfaces and the monomers are polymerized to form a film by exposing the coating of the radiation-curable composition to radiation, typically ultraviolet (UV) or electron-beam radiation.

Radiation-curable compositions utilizing photo-induced, free-radical polymerization reactions are finding uses today in a wide variety of industrial processes. See, for example, *Radiation Curing Science and Technology,* S. P. Pappas, editor, Plenum Press, New York 1992, page 2. For example, radiation-curable coating compositions are a mainstay of the wood coatings industry and are widely employed as protective and decorative coatings for metals, plastics and paper, as well as for photo-curable printing inks and adhesives. The use of radiation-curable coating compositions is growing rapidly due to the inherent low energy requirements of this technology as well as the need to eliminate the use of organic solvents which are air and water pollutants. In addition, the polymers that are formed possess excellent chemical resistance and mechanical properties. Free radical polymerizations have reached reasonably large commercial usage in the past decade and are currently growing at an overall rate of approximately 15% per year. This growth is expected to continue as industry becomes more aware of the manifold benefits of UV curing and as more restrictive environmental legislation mandating lower volatile organic compound emissions is enacted.

Radiation curing presents many advantages such as high production rates, low energy requirements and low equipment costs. In addition, it is advantageous that users are able to avoid using a solvent in the formulation of coating compositions. Solvents typically lead to environmental and/or safety hazards and require additional equipment and handling steps to remove the solvent.

Current research efforts are directed primarily to three major areas: (1) the design and synthesis of new photoinitiator systems, (2) the development of novel monomers and (3) the development of additives that modify either the cure characteristics or enhance the mechanical performance of existing photopolymerizable compositions, primarily acrylate and methacrylate systems. The present invention pertains to the use of poly(3,4-epoxy-1-butene) (polyepoxybutene) as a component of novel photoinitiator systems or compositions and as a matrix modifier in photoinitiated free radical photopolymerizations.

BRIEF SUMMARY OF THE INVENTION

The present invention provides a novel photopolymerizable coating composition comprising (i) an ethylenically-unsaturated, photopolymerizable compound or monomer; (ii) a photoinitiator; and (iii) polyepoxybutene. The polyepoxybutene is an inexpensive hydrogen donor synergist for the free radical polymerization of the ethylenically-unsaturated, photopolymerizable compound or monomer when the coating composition is exposed to UV radiation. Polyepoxybutene also may function as a chain transfer agent during the free radical polymerization and reduce the oxygen inhibition effect which is responsible for delayed and incomplete photopolymerizations when the free radical polymerization is carried out in the presence of oxygen. The oxygen inhibition effect can cause the coating to exhibit poor mechanical properties and chemical resistance, especially in thin film applications.

Another embodiment of the present invention is a coating or film comprising a polymer of an ethylenically-unsaturated, photopolymerizable compound or monomer and polyepoxybutene. The cured coating also contains a photoinitiator or photoinitiator residue. The cured coating is believed to comprise as the film-forming polymer an addition polymer derived from one or more ethylenically-unsaturated, photopolymerizable monomers having reacted therein or thereon polyepoxybutene. The coating compositions and coatings prepared therefrom may be used as protective and decorative coatings for metals, plastics, wood, and glass. They also may find use as adhesives, printing inks, electrical and electronic encapsulants.

Polyepoxybutene is a highly useful additive and matrix modifier for photoinitiated, free-radical crosslinking polymerizations. We have found that polyepoxybutene functions as a hydrogen donor together with aromatic ketones to form an efficient photoinitiating system for photopolymerization reactions. Polyepoxybutene can increase conversions in photocurable multifunctional acrylate systems due to both chain transfer and grafting effects. During photopolymerization, grafting of the ethylenically-unsaturated, photopolymerizable compound or monomer onto the backbone of polyepoxybutene takes place. Thus, polyepoxybutene becomes an integral part of the cured polymer matrix. We also have found that the polyepoxybutene present in our novel photopolymerizable coating compositions reduces oxygen inhibition effects in photoinduced free radical polymerization systems leading to lower cost curing processes through the elimination of the use of nitrogen as an inerting gas.

In addition, polyepoxybutene has other properties that make it valuable for free radical photocuring processes. Polyepoxybutene is a high molecular weight material with some film-forming characteristics. This makes it attractive for use in coating and ink formulations that require some viscoelastic properties for optimal deposition, flow and adhesion characteristics.

DETAILED DESCRIPTION

The ethylenically-unsaturated, photopolymerizable compound or monomer typically is an α,β-ethylenically-unsaturated, non-air-curing, free-radical-polymerizable monomer or oligomer or mixture of monomers or oligomers. The nature of the molecule is not critical so long as it is activated towards free-radical polymerization via the double bonds when it is exposed to UV radiation in the presence of a conventional photoinitiator compound. Such unsaturated compounds include among other types, acrylic monomers, styrenic monomers, vinyl ethers, vinyl esters, vinyl imides, vinyl amides, maleates, fumarates and mixtures thereof. Preferred monomers are acrylic monomers and oligomers and maleate and fumarate monomers and oligomers of number average molecular weight less than about 4000 containing from about 1 to about 10 unsaturated groups per molecule. A particularly preferred group of acrylic monomers is represented by the structure:

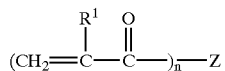

wherein $R^1$ is selected from hydrogen, methyl and ethyl, where n is 1 to 10, preferably 1, 2 or 3, and Z is a saturated or ethylenically-unsaturated residue of an alcohol or polyol, a carboxylic acid or polycarboxylic acid, an amine or a polyamine, an epoxide or polyepoxide or an isocyanate or polyisocyanate of a number average molecular weight less than about 4000 containing a hydrocarbon, ester, amide, ether or urethane backbone. Such monomers may be obtained by reaction of acryloyl, methacryloyl or ethacryloyl chloride with an alcohol, a polyol, an amine, or a polyamine or by the reaction of acrylic acid, methacrylic acid or ethacrylic acid with an epoxide, a polyepoxide, an isocyanate, or a polyisocyanate, or by reaction of a hydroxyalkyl acrylate, methacrylate or ethacrylate with a carboxylic acid, polycarboxylic acid, an epoxide, a polyepoxide, an isocyanate, or a polyisocyanate. Such monomers include methyl acrylate, methyl methacrylate, butyl acrylate, 1,3-butylene glycol diacrylate, 1,6-hexanediol diacrylate, the polyacrylates, polymethacrylates and polyethacrylates of polyethylene glycols and polyols, polypropylene glycols and polyols and poly(tetramethylene glycols) and poly(tetramethylene) polyols of molecular weight in the range of 100 to 4000, pentaerythritol tetraacrylate, trimethylolpropane triacrylate, dipentaerythritol monohydroxypentacrylate, ethoxylated bisphenol A dimethacrylate, the diacrylates, dimethacrylates and diethacrylates of epoxy compounds formed from bisphenol A and epichlorohydrin of molecular weight in the range of 200 to 4000, and the polyacryloyl monomers prepared by reacting isocyanate capped polyethers and isocyanate-capped polyesters of molecular weight up to 4000 with hydroxyethyl acrylate. The ethylenically-unsaturated, photopolymerizable compounds also may be selected from styrene and unsaturated polyesters, e.g., low molecular weight polyesters containing residues of maleic and/or fumaric acid, residues of one or more diols and, optionally, residues of one or more other dicarboxylic acids such as isophthalic acid. The ethylenically-unsaturated, photopolymerizable compounds most commonly used comprise multifunctional acrylic or methacrylic monomers such as: 1,6-hexanediol diacrylate, trimethylolpropane triacrylate, neopentylglycol diacrylate, diethyleneglycol diacrylate, pentaerythritol tetraacrylate, dipentaerythritol pentaacrylate, polyurethane diacrylate, and diacrylate esters of polyethylene glycols having molecular weights of about 200 to 10,000.

The photoinitiator present in the compositions of the present invention may be selected from the various photoinitiator compounds which are to cause the above-described ethylenically-unsaturated, photopolymerizable compounds to polymerize when a coating of the photopolymerizable compound containing the photoinitiator is exposed to UV, X-ray or electron beam radiation. Examples of such photoinitiators include aromatic ketones such as benzophenone, Michler's ketone [4,4'-bis(methylamino)benzophenone], 4,4'-bis(diethylamino)benzophenone, 4-acryloxy-4'-diethylaminobenzophenone, 4-methoxy-4'-dimethylaminobenzophenone, 2,2-dimethoxy-2-phenylacetophenone, camphorquinone, 2-ethylanthraquinone, phenanthraquinone, 2-t-butylanthraquinone, 1,2-benzanthraquinone, 2,3-benzanthraquinone, 2,3-dichloronaphthoquinone, benzil dimethyl ketal and other known aromatic ketones such as those described, for example, in U.S. Pat. No. 3,552,973; benzoin, benzoin ethers such as benzoin methyl ether, benzoin ethyl ether, benzoin isobutyl ether, and benzoin phenyl ether; methyl benzoin, ethyl benzoin and other benzoins.

The effective amount or concentration of the photoinitiator can vary depending upon a number of factors such as the rate of cure desired, the lamp intensity used, whether or not an inert atmosphere is used, the type of monomer(s) employed, and the presence of fillers, pigments and other additives. Normally, the amount of photoinitiator present in the photopolymerizable compositions of the present invention are in the range of about 0.1 to 10 mole percent based on the moles of ethylenically-unsaturated, photopolymerizable compound with concentrations of about 0.5 to 5.0 mole percent (same basis) being preferred.

The polyepoxybutene polymers which may be used in the present invention are known compositions of matter and may be prepared according to known procedures, e.g., the procedures in U.S. Pat. No. 5,536,882 and copending U.S. patent application Ser. No. 09/564,860 filed May 4, 2000 now U.S. Pat. No. 6,451,926. The polyepoxybutene polymers may be prepared by reacting or polymerizing 3,4-epoxy-1-butene(epoxybutene) in the presence 5 of an acidic or basic catalyst and a nucleophilic initiator. Examples of the polyepoxybutene polymers include polyether compounds comprising n units of residue (1) and m units of residue (2) wherein the total value of n+m is 2 to 70, preferably 3 to 20, n/(n+m) is a value of 0.70 to 1.00, and residues (1) and (2) have the structures:

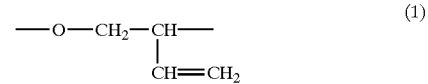

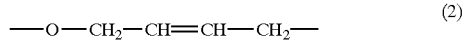

The polyepoxybutene polymers may be prepared by contacting 3,4-epoxy-1-butene with a hydroxyl initiator compound in the presence of a catalytic amount of an acidic compound as described in U.S. Pat. No. 5,536,882.

The amount of polyepoxybutene which may be present in the novel photopolymerizable coating composition of the present invention typically is about 1 to 80 weight percent, preferably about 5 to 20 weight percent, polyepoxybutene based on the total weight of the ethylenically-unsaturated, photopolymerizable compound or monomer and the polyepoxybutene.

The coating compositions may be prepared simply by mixing the liquid ethylenically-unsaturated, photopolymerizable monomer or monomers and the liquid polyepoxybutene and dissolving the photoinitiator in the mixed liquids. The coatings or films produced from the coating compositions of the present invention typically have a thickness of about 2.5 to 125 microns, more typically, about 12 to 75 microns. The coating compositions may contain other ingredients such as fillers, plasticizers, flow control agents, flatting agents, pigments, dyes and other colorants.

There are two major classes of high quantum yield photoinitiator systems used in free radical polymerizations. The first class comprises photofragmentation photoinitiators. Such photoinitiators undergo either Norrish type I or II bond cleavages upon excitation with UV light. These systems have the advantage of simplicity and high quantum yield but suffer from high cost and inherent thermal instability that limits pot life in the presence of highly reactive acrylate and methacrylate monomers. The second class of photoinitiator systems is called hydrogen abstraction photoinitiators and consists of an aromatic ketone in combination with a hydrogen donor. Upon excitation, the aromatic ketone undergoes efficient crossover from the initially formed excited singlet to the excited triplet state. The excited triplet ketone exhibits diradical character and abstracts hydrogen atoms from the donor. This reaction is exemplified below in equation 1 where D-H represents a hydrogen donor.

eq. 1

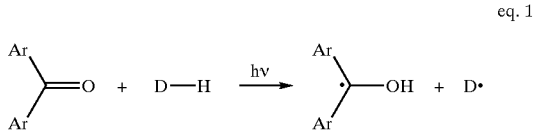

The benzhydrol free radical typically dimerizes while the radical formed by hydrogen abstraction can initiate the polymerization of a vinyl monomer. Typical aromatic ketones used for this purpose are benzophenone, Michler's ketone, thioxanthone and 2-isopropylthioxanthone. Although a wide variety of hydrogen donor synergists have been employed, the most popular are diethanolamine and triethanolamine. Hydrogen abstraction photoinitiators have the advantage that they are inexpensive and display excellent thermal stability. This latter feature is due to the fact that radical species are formed only on irradiation with light.

Polyepoxybutene is a polymeric allylic ether that possesses easily abstractable allylic ether hydrogen atoms in each repeating unit along the polymer backbone. Thus, polyepoxybutene functions as a hydrogen donor that together with an aromatic ketone may initiate polymerization under UV irradiation.

In addition to providing grafting sites along the chain for polymer attachment and growth, polyepoxybutene also functions as a chain transfer agent during polymerization. The mechanism proposed for chain transfer is depicted in equation 2:

eq. 2

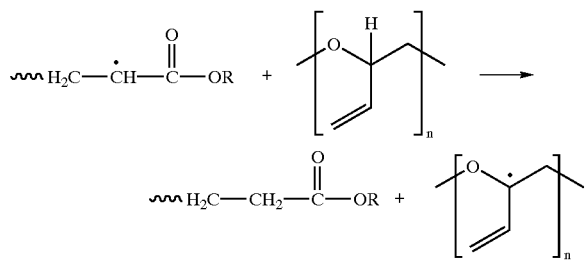

Hydrogen abstraction by the growing acrylate chain results in termination of that chain to form "dead" chains and at the same time generates potential new graft sites on polyepoxybutene. Typically, when multifunctional monomers are employed in photopolymerizations, the conversions are low due to entrapment of the growing free radical sites within the crosslinked matrix. However, the presence of a chain transfer agent should increase the overall conversion in these systems. Thus, we have found that photopolymerizable compositions containing polyepoxybutene proceed to higher conversions than those in which triethanolamine is used as a hydrogen donor.

As compared to conventional chain transfer agents in free radical polymerizations, the use of polyepoxybutene produces polymers with higher molecular weights (or higher crosslink densities). In contrast, conventional chain transfer agents have a strong molecular weight lowering effect on the resulting acrylate polymer, due to the presence of multiple hydrogen abstraction (i.e., chain transfer and graft) sites along the backbone.

One of the most difficult problems to overcome in free radical photopolymerizations is the sensitivity of these reactions to the presence of oxygen. The well known "oxygen inhibition effect" is responsible for delayed and incomplete photopolymerizations and contributes to poor mechanical properties and chemical resistance, particularly in thin film applications. This problem may be overcome by simply carrying out such polymerizations in an inert atmosphere such as nitrogen. However, this is not always an acceptable or practical solution that can be used in all cases and, especially, for many low-cost, high-speed applications. The oxygen inhibition problem can be minimized or avoided by including in the coating compositions additives that rapidly consume dissolved molecular oxygen in the film undergoing photopolymerization. Typically, the additives that are most useful are those that undergo facile autoxidation such as amines. Polyepoxybutene undergoes autoxidation by virtue of the presence of the easily abstracted allylic ether hydrogen atoms situated along the backbone. We have discovered that the addition of polyepoxybutene to photopolymerizable coating compositions comprising (i) an ethylenically-unsaturated, photopolymerizable compound or monomer and (ii) a photoinitiator results in the mitigation of the oxygen inhibition effect. Usually, the depletion of oxygen occurs more rapidly than the rate of diffusion of oxygen into the film of the coating composition allowing free radical polymerization of the ethylenically-unsaturated, photopolymerizable compound or monomer to proceed.

EXAMPLES

The coating compositions of the present invention and their preparation and use in preparing novel coatings are further illustrated by the following examples. The polyepoxybutene used in the examples was prepared by the boron trifluoride etherate-catalyzed, ring-opening polymerization of 3,4-epoxy-1-butene carried out in the presence of 1,4-butanediol. This hydroxyl-terminated oligomer had a ratio of residue (1) to residue (2) of 95:5 and a number average molecular weight ($M_n$) determined by gel permeation chromatography (GPC) of 1413 g/mol (polystyrene standards). The acrylic monomers used in this investigation were purified by distillation prior to use. Triethanolamine and the aromatic ketones used in this work were used as purchased unless otherwise noted. Routine infrared spectra were obtained using a Midac-M1300 Fourier transform Infrared spectrometer. Gas chromatographic (GC) analyses were performed using a Hewlett-Packard 5890 Gas Chromatograph equipped with a 10 m 5% OV-17 phenylsilicone capillary column and a flame ionization detector. $^1$H NMR experiments were carried out using either Varian XL-200 (200 MHz) or Inova-300 (300 MHz) spectrometers at room temperature using chloroform-d as the solvent and employing tetramethylsilane (TMS) as an internal standard. Thermal gravimetric analyses were carried out in air at a heating rate of 40° C./minute using a Perkin-Elmer (Stamford, Conn.) Thermal Analyzer equipped with a TGA-7 module. Gel permeation chromatography (GPC) was carried out with the aid of a Hewlett-Packard, Gel Permeation Chromatograph equipped with a refractive index detector and μ-styragel columns (particle size 5 μm, mixed 24–34 Å pores). Chloroform was used as the eluent at a flow rate of 1.0 mL/min.

The photopolymerizable coating compositions were prepared by dissolving the aryl ketone in the monomer and then adding polyepoxybutene at room temperature. One drop of the photopolymerizable coating compositions was placed onto a 12 μm oriented and corona treated polypropylene film (General Electric Capacitor Dept., Hudson Falls, N.Y.), covered with an identical polypropylene film, and then mounted in 5 cm×5 cm slide frames. These samples are designated as "covered" indicating that they are protected by means of the polymer film from the atmosphere. Other samples were knife coated onto the polypropylene films and mounted as described above in 5 cm×5 cm slide frames. These samples are designated as "uncovered" since the liquid films are exposed to atmospheric oxygen. The thickness of the coating composition films was estimated at 10–25 μm. The coating compositions were polymerized (cured) using broadband, i.e., unfiltered UV irradiation from a mercury arc lamp. Photopolymerizations of the coating compositions were carried out at room temperature and were monitored using Fourier transform real-time infrared spectroscopy (FT-RTIR). A Midac M-1300 FTIR spectrometer equipped with a liquid nitrogen cooled mercury-cadmium-telluride detector was used. The instrument was fitted with a UVEXS Model SCU-110 mercury arc lamp equipped with a flexible liquid optic wand. The end of this wand was directed at an incident angle of 45° onto the sample window and the distance from the window varied from 6–18 cm to control the light intensity. UV light intensities were measured with the aid of a radiometer (UV Process Supply, Inc., Chicago, Ill.) at the sample window. A light intensity of 10 mW/cm$^2$ was employed in the photopolymerizations described in the examples.

Infrared spectra were collected at a rate of 1 spectrum per second using LabCalc, data acquisition software obtained from the Galactic Industries Corp. and were processed using GRAMS-386 software from the same company. During irradiation, the decrease in the absorbance band due to the carbonyl groups at 1640 cm$^{-1}$ of the respective acrylic monomers was monitored. Data analysis and subsequent conversion versus time plots were obtained using Excel software (Microsoft Corp. Redmond, Wash.). Three to five runs were performed for each kinetic study and the results averaged to give the final conversion versus time data contained in the following tables. Under these conditions, the run-to-run reproducibility was ±5%.

Example 1

A solution of 1,6-hexanediol diacrylate (2.26 g), benzophenone (0.018 g, 2.0% based on moles of 1,6-hexanediol diacrylate) and polyepoxybutene (0.056 g, 8% based on moles of 1,6-hexanediol diacrylate) was prepared by mixing the above components at room temperature. Covered samples of this composition were prepared and cured as described above by exposure to UV light in the sample compartment of a FTIR spectrometer. The rate of curing (polymerization) of the coating is shown in Table I wherein Conversion (in percent) is determined by following the disappearance of the infrared absorption of the acrylate double bonds at 1640 cm$^{-1}$ of the starting material as a function of irradiation Time (in seconds) during the course of the UV induced polymerization.

Comparative Example 1

A solution of 1,6-hexanediol diacrylate (2.26 g), benzophenone (0.018 g, 2.0% based on moles of 1,6-hexanediol diacrylate) and triethanolamine (0.12 g, 8% based on moles of 1,6-hexanediol diacrylate was prepared by mixing the above components at room temperature. Covered samples of this composition were prepared and UV cured as described above. The rate of curing (polymerization) of the coating is shown in Table I.

Example 2

There were mixed together at room temperature 1,6-hexanediol diacrylate (2.26 g), 2-isopropylthioxanthone (0.0508 g, 2.0% based on moles of 1,6-hexanediol diacrylate) and polyepoxybutene (0.056 g, 8% based on moles of 1,6-hexanediol diacrylate). Samples of this composition were prepared and cured as described above. The rate of curing (polymerization) of the samples is shown in Table I.

Comparative Example 2

1,6-Hexanediol diacrylate (2.26 g), 2-isopropylthioxanthone (0.0508 g, 20% moles of 1,6-hexanediol diacrylate) and triethanolamine (0.12 g, 8% based on moles of 1,6-hexanediol diacrylate) were combined as described above. Samples of this composition were prepared and UV cured as described above. The rate of curing (polymerization) of the sample was determined by FT-RTIR and is shown in Table I.

TABLE I

| | Conversion for Composition of Example | | | |
|---|---|---|---|---|
| Time | 1 | C-1 | 2 | C-2 |
| 5 | 0.6 | 39.8 | 0.3 | 0.9 |
| 10 | 2.7 | 48.4 | 2.7 | 3.1 |
| 15 | 7.6 | 51.5 | 7.6 | 5.8 |
| 20 | 13.3 | 53.0 | 13.3 | 9.0 |
| 25 | 19.8 | 54.3 | 19.8 | 10.1 |
| 30 | 27.9 | 55.4 | 27.9 | 10.6 |
| 35 | 33.2 | 56.2 | 33.2 | 11.7 |
| 40 | 38.8 | 56.9 | 38.8 | 11.8 |
| 45 | 43.7 | 57.3 | 43.7 | 13.4 |
| 50 | 47.4 | 57.6 | 47.4 | 15.6 |
| 55 | 51.9 | 58.0 | 51.9 | 16.5 |
| 60 | 54.2 | 58.6 | 54.2 | 19.2 |
| 65 | 57.4 | 58.8 | 57.4 | 22.0 |
| 70 | 58.7 | 59.1 | 58.7 | 24.8 |
| 75 | 60.8 | 59.1 | 60.8 | 27.7 |
| 80 | 62.4 | 59.7 | 62.4 | 31.1 |
| 85 | 64.1 | 59.7 | 64.1 | 33.5 |
| 90 | 65.1 | 60.0 | 65.1 | 34.6 |
| 95 | 66.5 | 60.0 | 66.5 | 36.4 |
| 100 | 68.0 | 60.1 | 67.1 | 37.3 |

Examples 3–5

To determined the effect of polyepoxybutene concentration on photopolymerization rate, three compositions consisting of 1,6-hexanediol diacrylate (2.26 g), benzophenone (0.018 g, 2.0% based on moles of 1,6-hexanediol diacrylate) and Example 3: poxybutene (0.035 g, 5% based on moles of 1,6-hexanediol diacrylate), Example 4: poxybutene (0.15 g, 15% based on moles of 1,6-hexanediol diacrylate), and Example 5: poxybutene (0.14 g, 20% based on moles of 6-hexanediol diacrylate), were prepared as described in Example 1. Coatings of these compositions were prepared and cured as described above.

The rates of curing (polymerization) of the coating compositions of Examples 3, 4 and 5 are shown in Table II wherein Conversion and Time have the meaning given previously.

TABLE II

| | Conversion for Composition of Example | | |
|---|---|---|---|
| Time | 3 | 4 | 5 |
| 5 | 0.6 | 6.7 | 5.4 |
| 10 | 2.7 | 20.5 | 15.1 |
| 15 | 7.6 | 33.8 | 27.6 |
| 20 | 13.3 | 44.7 | 37.8 |
| 25 | 19.6 | 51.8 | 45.0 |
| 30 | 25.5 | 57.5 | 55.4 |
| 35 | 32.5 | 61.2 | 59.8 |
| 40 | 36.5 | 64.7 | 63.7 |
| 45 | 41.8 | 67.2 | 70.9 |
| 50 | 45.5 | 69.7 | 73.7 |
| 55 | 49.6 | 71.7 | 77.2 |
| 60 | 53.7 | 72.8 | 78.6 |
| 65 | 55.5 | 74.4 | 82.4 |
| 70 | 58.5 | 75.4 | 83.9 |
| 75 | 60.0 | 76.3 | 84.3 |
| 80 | 61.3 | 77.3 | 89.4 |
| 85 | 63.5 | 78.5 | 89.4 |
| 90 | 64.9 | 78.6 | 89.0 |
| 95 | 65.4 | 79.6 | 90.8 |
| 100 | 67.4 | 79.9 | 90.9 |

Example 6

1,6-Hexanediol diacrylate (2.26 g), 2,2-dimethoxy-2-phenylacetophenone (0.0512 g, 2.0% based on moles of 1,6-hexanediol diacrylate) and polyepoxybutene (0.028 g, 4% based on moles of 1,6-hexanediol diacrylate) were mixed together at room temperature. Samples of this composition were prepared and cured as described above both covered with a polypropylene film "COVERED" (Example 6A) and coated on a single film of polypropylene "UNCOVERED" (Example 6B). The rate of UV curing (polymerization) of the coatings is shown in Table III wherein Conversion and Time have the meanings given previously.

Comparative Example 3

1,6-Hexanediol diacrylate (2.26 g) and 2,2-dimethoxy-2-phenylacetophenone (0.0512 g, 2.0% based on moles of 1,6-hexanediol diacrylate) i.e., no polyepoxybutene were combined as described above. "Uncovered" samples of this composition were prepared and UV cured by irradiation with UV light as described in Example 6. The rate of UV curing (polymerization) of the coating is shown in Table III (Example C3).

TABLE III

| | Conversion for Composition of Example | | |
|---|---|---|---|
| Time | 6A | 6B | C3 |
| 5 | 2 | 2 | 1 |
| 10 | 7 | 18 | 5 |
| 15 | 22 | 35 | 11 |
| 20 | 40 | 45 | 20 |
| 25 | 55 | 53 | 25 |
| 30 | 63 | 62 | 30 |
| 35 | 64 | 63 | 35 |
| 40 | 65 | 65 | 40 |
| 45 | 66 | 66 | 42 |
| 50 | 67 | 67 | 43 |
| 55 | 67 | 68 | 44 |
| 60 | 67 | 70 | 45 |
| 65 | 68 | 72 | 46 |
| 70 | 69 | 73 | 47 |
| 75 | 70 | 74 | 48 |
| 80 | 70 | 75 | 50 |
| 85 | 70 | 76 | 50 |
| 90 | 70 | 77 | 50 |
| 95 | 70 | 78 | 50 |
| 100 | 70 | 80 | 50 |

Example 7 n-Butyl acrylate (2.56 g), 2-isopropylthioxanthone (0.102 g, 2.0% based on moles of butyl acrylate) and polyepoxybutene (0.112 g, 8% based on moles of butyl acrylate) were mixed together as previously described. Both "covered" (Example 7A) and "uncovered" (Example 7B) samples of this composition were prepared and UV cured as described above. The rate of UV curing (polymerization) of the samples was determined by FT-RTIR and the data is shown in Table IV wherein Conversion and Time have the meaning given previously. The data of Table IV show that there is very little difference between the polymerization rates of coating compositions containing polyepoxybutene carried out in a covered and uncovered mode. As noted before, these acrylate monomers do not polymerize when aromatic ketones are used in the absence of polyepoxybutene. In this experiment, poxybutene provides two important effects: (1) It functions as a hydrogen donor as part of the photoinitiator system; and (2) it serves as an oxygen scavenger to reduce the oxygen inhibition effect.

TABLE IV

| | Conversion for Composition of Example | |
|---|---|---|
| Time | 7A | 7B |
| 5 | 2 | 6 |
| 10 | 9 | 9 |
| 15 | 17 | 14 |
| 20 | 22 | 16 |
| 25 | 27 | 21 |
| 30 | 31 | 25 |
| 35 | 35 | 28 |
| 40 | 37 | 29 |
| 45 | 37 | 30 |
| 50 | 38 | 30 |
| 55 | 38 | 30 |
| 60 | 39 | 32 |
| 65 | 39 | 33 |
| 70 | 39 | 31 |
| 75 | 39 | 30 |
| 80 | 39 | 31 |
| 85 | 39 | 31 |
| 90 | 39 | 29 |
| 95 | 39 | 28 |
| 100 | 39 | 29 |

Example 8 n-Butyl acrylate (2.56 g), Michler's ketone (0.0536 g, 2.0% based on moles of butyl acrylate) and polyepoxybutene (0.112 g, 8% based on moles of butyl acrylate) were combined with stirring at room temperature to make a homogeneous solution. Both "covered" (Example 8A) and "uncovered" (Example 8B) samples of this composition were prepared and cured as described above. The rate of UV curing (polymerization) of the coatings is shown in Table V wherein Conversion and Time have the meanings given previously.

TABLE V

| | Conversion for Composition of Example | |
|---|---|---|
| Time | 8A | 8B |
| 5 | 1.5 | 1.5 |
| 10 | 9.0 | 9.3 |
| 15 | 16.8 | 13.5 |
| 20 | 21.2 | 16.7 |
| 25 | 27.1 | 20.9 |
| 30 | 30.9 | 24.7 |
| 35 | 31.1 | 28.0 |
| 40 | 36.4 | 28.7 |
| 45 | 38.0 | 29.7 |
| 50 | 38.2 | 29.8 |
| 55 | 38.3 | 29.6 |
| 60 | 39.6 | 32.1 |
| 65 | 40.9 | 32.4 |
| 70 | 41.6 | 32.5 |
| 75 | 47.2 | 33.9 |
| 80 | 48.2 | 35.5 |
| 85 | 48.8 | 36.2 |
| 90 | 50.9 | 37.5 |
| 95 | 51.7 | 38.6 |
| 100 | 52.1 | 39.0 |

Example 9

Trimethylolpropane triacrylate (5.92. g), 2-isopropylthioxanthone (0.102 g, 20% based on moles of the triacrylate) and polyepoxybutene (0.112 g, 8% based on moles of the triacrylate) were combined with stirring at room temperature to make a homogeneous solution. Both "covered" (Example 9A) and "covered" (Example 9B) samples of this composition were prepared and cured as described above. The rate of UV curing (polymerization) of the coatings is shown in Table VI wherein Conversion and Time have meanings given previously.

TABLE VI

| | Conversion for Composition of Example | |
|---|---|---|
| Time | 9A | 9B |
| 5 | 6.8 | 1.3 |
| 10 | 17.3 | 3.4 |
| 15 | 24.5 | 4.1 |
| 20 | 28.5 | 3.9 |
| 25 | 31.6 | 4.1 |
| 30 | 33.4 | 4.8 |
| 35 | 35.2 | 5.1 |
| 40 | 36.2 | 6.8 |
| 45 | 37.1 | 7.4 |
| 50 | 38.4 | 8.4 |
| 55 | 39.1 | 9.3 |
| 60 | 40.0 | 10.4 |
| 65 | 40.7 | 12.0 |
| 70 | 41.5 | 14.0 |
| 75 | 42.2 | 15.1 |
| 80 | 42.3 | 16.0 |
| 85 | 43.0 | 16.6 |
| 90 | 43.6 | 18.9 |
| 95 | 44.2 | 20.0 |
| 100 | 45.1 | 21.2 |

Example 10

Isobornyl acrylate (4.17 g), benzophenone (0.083 g, 2.0 weight percent based on the weight of isobornyl acrylate and polyepoxybutene (1.02 g, 25 weight percent based on the weight of the isobornyl acrylate were combined with stirring at room temperature to make a homogeneous solution. A thin sample of this composition was prepared and UV cured as described above for a period of 2 minutes. The polymeric film that was obtained was dissolved in chloroform and precipitated into methanol. This procedure was repeated twice to free the polymer from residual monomer. Comparison of a $^1$H NMR spectrum of the dried polymer with the spectra of authentic samples of polyepoxybutene and isobornyl acrylate show that the polymeric coating bears a series of new methyl bands that can be attributed to the isobornyl group of the acrylate grafted polymer. The polymer also contains resonances that can be attributed to the allylic double bond of polyepoxybutene. This experiment demonstrates that acrylate groups are efficiently grafted onto the backbone of polyepoxybutene during free radical polymerization.

Reference Example 1

The following procedure is exemplary of the methods by which polyepoxybutene useful in the present invention may be prepared using an acidic catalyst.

A 3000-mL, four-neck, jacketed, round-bottom flask equipped with a mechanical stirrer, thermocouple, condenser, and liquid feed pump was purged with nitrogen then charged with 90.8 g of 1,4-butanediol (1.01 mole) and 16.4 g (0.12 mole) of boron trifluoride etherate. To the rapidly-stirred mixture was added 3,4-epoxy-1-butene via feed pump. During the addition, the temperature was allowed to rise from room temperature then it was held at 30–35° C. After 1141 g of 3,4-epoxy-1-butene had been added, the catalyst was judged to have become deactivated (no longer exothermic). The addition was briefly stopped to add another 3.8 g of boron trifluoride etherate (dissolved in 3.8 g of diethyl ether) to the mixture. The monomer addition was continued with three more catalyst additions (total catalyst weight 25.4 g, 0.18 mole). A total of 1401.4 g (19.99 moles) of 3,4-epoxy-1-butene was added over seven hours. The mixture was stirred at room temperature overnight. Twelve grams of water was added to the reaction mixture then it was stirred for three hours before adding 65.6 g of calcium oxide. After several hours the slurry was filtered through a steam-heated filter funnel containing Celite® to give a light yellow liquid. This liquid was stripped of low boiling point components by passage through a wiped-film evaporator at 129° C. and 1.2 mm. The polyepoxybutene was the non-volatile fraction (1252 g, 83.9%). Analysis by GPC (THF, polystyrene equivalent molecular weight) showed $M_p$=1820, $M_n$=1413, $M_w$=2438. Analysis by $^1$H NMR (acetone-$d_6$) showed a n/(n+m) ratio of 0.95 and $M_n$=1314. Brookfield viscosity was 1364 cP at 24° C. The hydroxyl number was 82.6.

Reference Example 2

The following procedure is exemplary of the methods by which polyepoxybutene useful in the present invention may be prepared using a basic catalyst.

A 3000-mL, four-neck, round-bottom flask equipped with a mechanical stirrer, thermocouple, distillation head, and addition funnel was purged with nitrogen then charged with 2500 g of 1,4-butanediol (27.74 mole) and a solution of 95.98 g of 85% potassium hydroxide in 91.5 g of water. The mixture was heated to 95° C. then held at this temperature for two hours. The reaction mixture was placed under vacuum (1.5 mm) at 95° C. with nitrogen bubbling into the liquid to strip out low boiling point components (114.2 g). The resulting solution (2452.0 g) was transferred and stored under nitrogen in a glass container. This solution of the potassium salt of 1,4-butanediol was used as starter for base-catalyzed polymerizations of 3,4-epoxy-1-butene as described in the following typical example.

A one-gallon autoclave equipped with a mechanical stirrer, thermocouple, cooling coil, and addition port was purged with nitrogen then charged with 600.05 g of the potassium salt of 1,4-butanediol in 1,4-butanediol. The autoclave was heated to 110° C. and then 2600 grams of 3,4-epoxy-1-butene were added through the addition port at a feed rate that maintained the reactor temperature between 110° C. and 115° C. (pressure 0.34 to 2.76 bars gauge, barg −5 to 40 pounds per square inch, psig). The addition was completed over a period of approximately 6 hours and heating at 110° C. and 115° C. was continued for 2 more hours. The autoclave was purged vigorously with nitrogen through a dip tube in the autoclave at 110° C. for 0.5 hour then placed under vacuum (0.5 mm) with nitrogen bubbling into the liquid to strip out low boiling point components at 110° C. for 0.5 hour. The autoclave was brought to one atmosphere with nitrogen, cooled to 95° C. then 120 g of Magnesol® (synthetic magnesium silicate), 40 g of Celite® filter aid, and 50 g of de-ionized water were added under nitrogen. The autoclave was heated to 110° C. and held for two hours. The autoclave was placed under vacuum (0.5 mm) with nitrogen bubbling into the liquid at 110° C. for one hour to remove water. The reaction mixture was filtered under nitrogen pressure (1.38 to 3.45 barg −20 to 50 psig) through Celite® affording 2908 g of polyepoxybutene as a light yellow liquid. Analysis by GPC (THF, polystyrene equivalent molecular weight) showed $M_p=747$, $M_n=538$, $M_w=690$. Analysis by NMR (acetone-$d_6$) showed a n/(n+m) ratio of 1.0 and $M_n=492$.

The invention has been described in detail with particular reference to preferred embodiments thereof, but it will be understood that variations and modifications can be effected within the spirit and scope of the invention.

We claim:

1. A photopolymerizable coating composition comprising (i) an ethylenically-unsaturated, photopolymerizable monomer; (ii) a photoinitiator; and (iii) poly(3,4-epoxy-1-butene) (polyepoxybutene).

2. A photopolymerizable coating composition according to claim 1 wherein the polyepoxybutene comprises n units of residue (1) and m units of residue (2) wherein the total value of n+m is 2 to 70, n/(n+m) is a value of 0.70 to 1.00, and residues (1) and (2) have the structures:

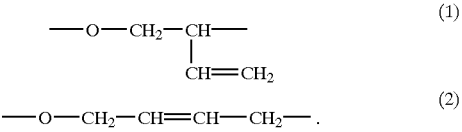

3. A photopolymerizable coating composition according to claim 2 wherein the photoinitiator is selected from benzophenone, 4,4'-bis(methylamino)benzophenone, 4,4'-bis(diethylamino)benzophenone, 4-acryloxy-4'-diethylaminobenzophenone, 4-methoxy-4'-dimethylaminobenzophenone, 2,2-dimethoxy-2-phenylacetophenone, camphorquinone, 2-ethylanthraquoinone, phenanthraquinone, 2-t-butylanthraquinone, 1,2-benzanthraquinone, 2,3-benzanthraquinone, 2,3-dichloronaphthoquinone, benzil dimethyl ketal, benzoin, benzoin ethers, methyl benzoin, and ethyl benzoin.

4. A photopolymerizable coating composition according to claim 3 wherein the ethylenically-unsaturated, photopolymerizable monomer is selected from 1,6-hexanediol diacrylate, trimethylolpropane triacrylate, neopentylglycol diacrylate, diethyleneglycol diacrylate, pentaerythritol tetraacrylate, dipentaerythritol pentaacrylate, polyurethane diacrylate, diacrylate esters of polyethylene glycols having molecular weights of about 200 to 10,000 and mixtures of two or more thereof.

5. A photopolymerizable coating composition comprising (i) an ethylenically-unsaturated, photopolymerizable monomer; (ii) about 0.5 to 5.0 weight percent, based on the weight of the ethylenically-unsaturated, photopolymerizable monomer, of a photoinitiator; and (iii) and about 5.0 to 20 weight percent, based on the weight of the ethylenically-unsaturated, photopolymerizable monomer, of poly(3,4-epoxy-1-butene) (polyepoxybutene).

6. A photopolymerizable coating composition according to claim 5 wherein the polyepoxybutene comprises n units of residue (1) and m units of residue (2) wherein the total value of n+m is 3 to 20, n/(n+m) is a value of 0.70 to 1.00, and residues (1) and (2) have the structures:

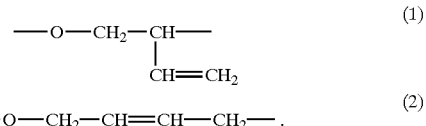

7. A photopolymerizable coating composition according to claim 6 wherein the photoinitiator is selected from benzophenone, 4,4'-bis(methylamino)benzophenone, 4,4'-bis(diethylamino)benzophenone, 4-acryloxy-4'-diethylaminobenzophenone, 4-methoxy-4'-dimethylaminobenzophenone, 2,2-dimethoxy-2-phenylacetophenone, camphorquinone, 2-ethylanthraquoinone, phenanthraquinone, 2-t-butylanthraquinone, 1,2-benzanthraquinone, 2,3-benzanthraquinone, 2,3-dichloronaphthoquinone, benzil dimethyl ketal, benzoin, benzoin ethers, methyl benzoin, and ethyl benzoin.

8. A photopolymerizable coating composition according to claim 7 wherein the ethylenically-unsaturated, photopolymerizable monomer is selected from 1,6-hexanediol diacrylate, trimethylolpropane triacrylate, neopentylglycol diacrylate, diethyleneglycol diacrylate, pentaerythritol tetraacrylate, dipentaerythritol pentaacrylate, polyurethane diacrylate, diacrylate esters of polyethylene glycols having molecular weights of about 200 to 10,000 and mixtures of two or more thereof.

9. A coating comprising a polymer of an ethylenically-unsaturated, photopolymerizable monomer and polyepoxybutene.

10. A coating according to claim 9 comprising as the film-forming polymer an addition polymer derived from one or more ethylenically-unsaturated, photopolymerizable monomers having reacted therein or thereon polyepoxybutene.

11. A coating according to claim 10 having a thickness of about 12 to 75 microns wherein the ethylenically-unsaturated, photopolymerizable monomer is selected from 1,6-hexanediol diacrylate, trimethylolpropane triacrylate, neopentylglycol diacrylate, diethyleneglycol diacrylate, pentaerythritol tetraacrylate, dipentaerythritol pentaacrylate, polyurethane diacrylate, diacrylate esters of polyethylene glycols having molecular weights of about 200 to 10,000 and mixtures of two or more thereof; and the polyepoxybutene comprises n units of residue (1) and m units of residue (2) wherein the total value of n+m is 3 to 20, n/(n+m) is a value of 0.70 to 1.00, and residues (1) and (2) have the structures:
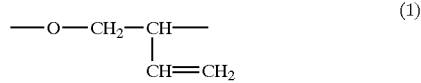 (1)
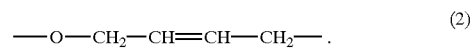 (2)
* * * * *